No. 706,446. Patented Aug. 5, 1902.
J. E. PARK & J. L. PICKENS.
COMBINED PLOW AND PLANTER.
(Application filed Oct. 15, 1901.)
(No Model.) 2 Sheets—Sheet 1.
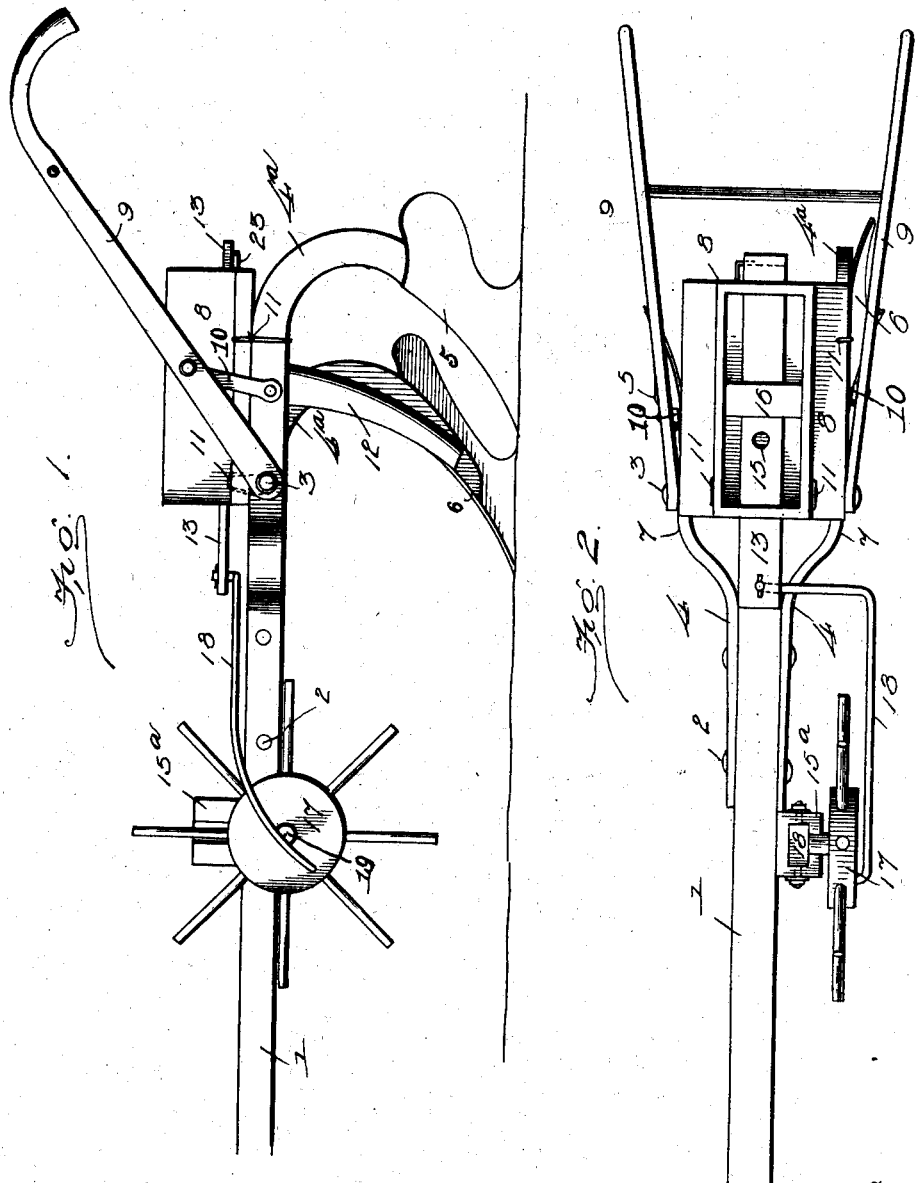
Witnesses
Inventors
James E. Park,
James L. Pickens,
By Victor J. Evans
Attorney

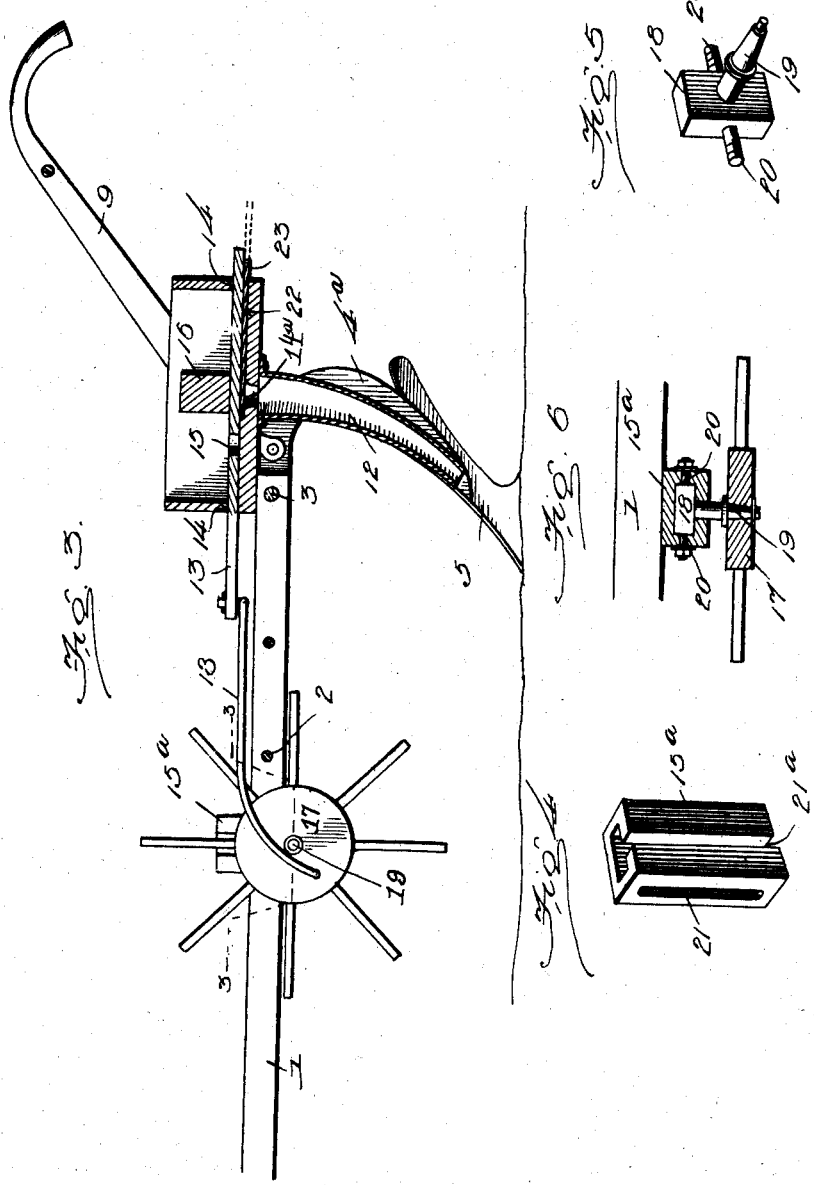

UNITED STATES PATENT OFFICE.

JAMES E. PARK AND JAMES L. PICKENS, OF MOORESVILLE, TENNESSEE.

COMBINED PLOW AND PLANTER.

SPECIFICATION forming part of Letters Patent No. 706,446, dated August 5, 1902.

Application filed October 15, 1901. Serial No. 78,710. (No model.)

*To all whom it may concern:*

Be it known that we, JAMES E. PARK and JAMES L. PICKENS, citizens of the United States, residing at Mooresville, in the county of Marshall and State of Tennessee, have invented new and useful Improvements in a Combined Plow and Planter, of which the following is a specification.

Our invention relates to certain new and useful improvements in combined plows and planters, and has more particular reference to that class wherein the plow turns the furrow and the seed is automatically dropped and afterward covered by suitable turn-shovels or covering-plows.

Our invention has for its object to provide a plow and planter of this general character which can be readily adapted for planting different kinds of seed, such as corn, peas, &c.

A further object is to provide means whereby the seed may be automatically dropped as the plow turns the furrow and to provide means for covering this seed after it has been dropped.

In the accompanying drawings, Figure 1 is a view in side elevation of our invention complete. Fig. 2 is a top plan view of the same. Fig. 3 is a view partly in side elevation and partly in section. Fig. 4 is an enlarged perspective of the wheel-bearing guideway. Fig. 5 is an enlarged perspective of the wheel-bearing. Fig. 6 is a horizontal section on the line 3 3 of Fig. 3.

Referring to the drawings by numerals of reference, 1 represents the plow-beam, to which are secured by bolts 2 and 3 supplemental beams 4, which are arranged on either side of the plow-beam 1. The supplemental beams 4 extend parallel with the plow-beam for a short distance and have their rear ends turned downward to form standards $4^a$, to which are secured the turn-shovels or covering-plow 5 and the furrow-opener 6. The rear portions of the supplemental beams through which the bolt 3 passes are curved outward from the plow-beam, as at 7, so as to provide a suitable support for a hopper or seed-receptacle 8.

9 designates suitable handles, which are bolted to the frame by the bolt 3 and are braced by bars 10.

The seed-hopper 8 is mounted upon the rear end of the plow-beam and upon the supplemental beams between the plow-handles, and it is secured in position by straps or bands 11, which engage the said bolt 3 and the supplemental beams.

Secured to the under side of the hopper is a centrally-arranged seed-chute 12.

13 designates a sliding feed-plate which passes through openings 14 in the ends of the seed-hopper above the discharge-opening $14^a$, which is arranged in the hopper-bottom. The sliding plate is provided with an opening 15, which is adapted to receive the seed and upon being reciprocated deposit the same in the seed-spout.

16 designates a transverse bar or cut-off arranged within the hopper above the sliding plate and prevents more than the desired quantity of seed from escaping when the opening in the sliding plate registers with the discharge-spout. In a vertically-arranged guideway $15^a$, attached to the plow-beam a little in front of the seed-hopper 8, is adjustably mounted a bearing-block for the wheel 17, said wheel being adapted to support the front of the machine and to reciprocate the sliding plate 13 through the medium of a rod which is eccentrically secured at its forward end to the wheel 17 and has its other end connected to the sliding feed-plate.

The bearing-guide $15^a$ receives a sliding block 18, from the outer side of which projects the axle 19, upon which the wheel 17 is mounted. In order that the wheel may be held in its adjusted position, the sliding block 18 is provided at its ends with oppositely-projecting threaded arms 20, extending through elongated slots or guideways 21 in the guide $15^a$, and are provided on their outer ends with securing-nuts. The guide $15^a$ is also formed at its outer side with a vertical slot $21^a$, extending throughout the length of the guide, through which the axle projects. The slot $21^a$ permits the axle to be adjusted vertically.

Arranged beneath the sliding feed-plate 13 in an opening 22 is a cut-off slide 23. The object of this slide is to close the opening in the bottom of the hopper when desired to prevent the discharge of seed.

Having thus fully described our invention, what we claim as new, and desire to secure by Letters Patent, is—

In a corn-planter the combination with a hopper, and a slide arranged therein, of means for reciprocating said slide comprising a wheel supported in front of the hopper, a connection between said wheel and slide, and supporting and adjusting devices for the wheel consisting of a guide formed with elongated slots at the front and rear, and a vertical slot at the outer side, a block within said guide having threaded projecting arms, nuts on said arms, and an axle projecting from the outer side of the block.

In testimony whereof we affix our signatures in presence of two witnesses.

JAMES E. PARK.
JAMES L. PICKENS.

Witnesses:
A. E. McCONNELL,
LOWRY ORR.